UNITED STATES PATENT OFFICE.

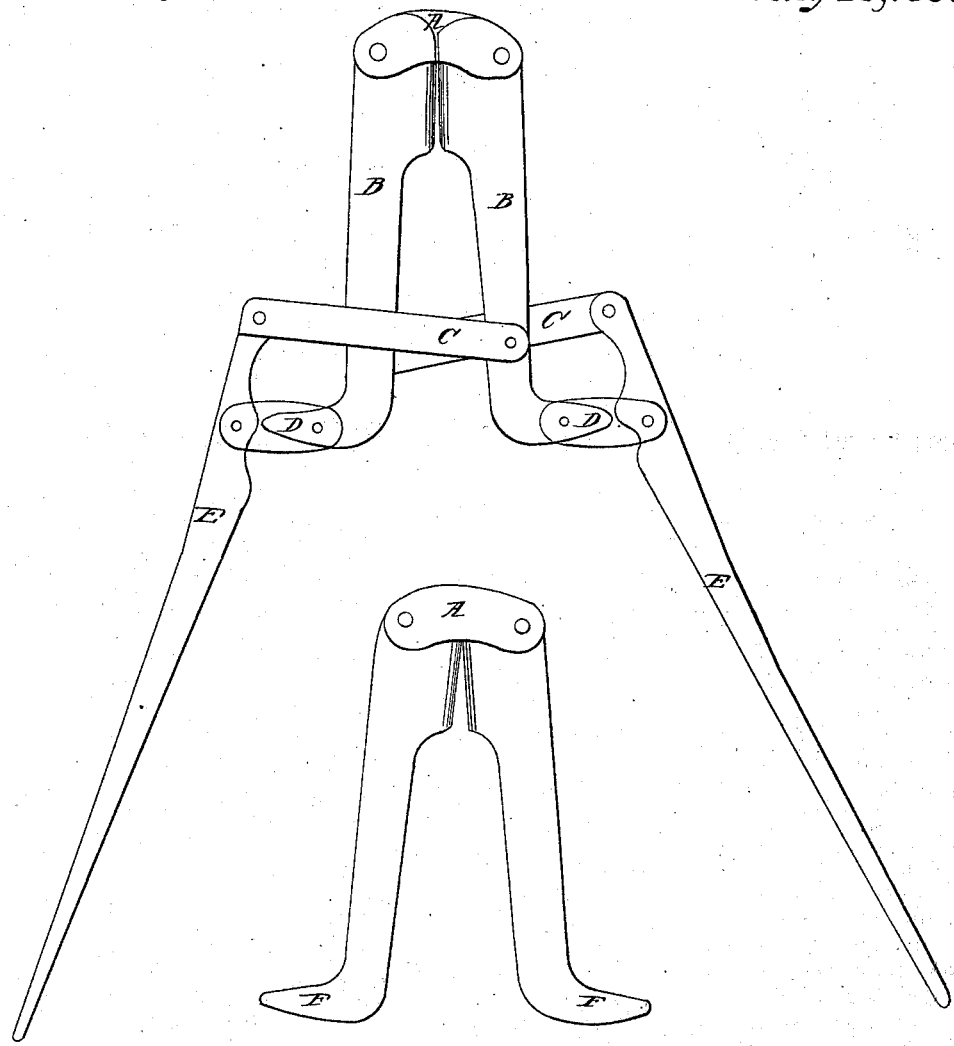

GEORGE W. HYATT, OF AUBURN, NEW YORK.

IMPROVEMENT IN SHEARS FOR CUTTING IRON BOLTS.

Specification forming part of Letters Patent No. 47,832, dated May 23, 1865.

*To all whom it may concern:*

Be it known that I, GEORGE W. HYATT, of Auburn, in the county of Cayuga and State of New York, have invented a new and Improved Shears for Cutting Iron Bolts or Metal of any Kind; and I do hereby declare that the following is a real and full and exact description of the said invention.

The nature of my invention consists in hinging two eccentric levers, B B, together by means of the bar A, fastened with bolts. The jaws, when thus fastened to each end of the bar A and worked, have an eccentric motion, and consequently an eccentric power, increasing as the jaws are brought nearer together. When open, they receive the bolt or metal to be cut nearer the center of power than any other shears known; and as the eccentric motion of the levers obtained by the construction of the hinge at the bar A draws the bolt or metal to be cut still nearer to the center of power as the levers are brought nearer together, the greatest power possible is thus obtained. The levers B B are worked by the attachment of two other levers, E E, forming combination-levers, and thus further increasing the power. The construction of said levers and their bearings is what I claim as my own invention, and is thus described: The levers B B are turned to the right and left at the ends F F, forming fulcrums for the levers E E, and so shaped that, together with curves in the levers E E, an extensive and easy motion is obtained, while the bearing is at the same time preserved, thus avoiding friction and strain common to other combination-shears.

What I claim as my invention is—

The shear-bars B B, pivoted to the bar A, as shown, for the purpose already described.

I further state that these inventions for which I enter claim were perfected by me on the 1st day of October, in the year 1864.

Dated at Auburn, January 19, 1865.

GEORGE W. HYATT.

Witnesses:
 MERRITT GALLY,
 HORACE T. COOK.